(12) United States Patent　(10) Patent No.: US 7,452,144 B2
Tokiwa et al.　(45) Date of Patent: Nov. 18, 2008

(54) CAMERA

(75) Inventors: Kentaro Tokiwa, Saitama (JP);
Takehiko Senba, Saitama (JP); Hiroshi Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 412 days.

(21) Appl. No.: 11/231,908

(22) Filed: Sep. 22, 2005

(65) Prior Publication Data

US 2006/0067677 A1　Mar. 30, 2006

(30) Foreign Application Priority Data

Sep. 24, 2004　(JP)　............................. 2004-277172

(51) Int. Cl.
*G03B 17/00*　(2006.01)
*G03B 17/38*　(2006.01)
(52) U.S. Cl. ......................................... 396/502; 396/48
(58) Field of Classification Search .................. 396/48, 396/213, 439, 502; 348/345, 362
See application file for complete search history.

(56) References Cited

U.S. PATENT DOCUMENTS 4,456,357 A * 6/1984 Sunouchi et al. ............ 396/263
4,750,013 A * 6/1988 Yasukawa ................... 396/130
5,752,117 A * 5/1998 Hori ........................... 396/504
5,907,138 A * 5/1999 Metzler ....................... 200/1 B

FOREIGN PATENT DOCUMENTS

JP　2003-280076 A　10/2003
JP　2003-287799 A　10/2003
JP　2004-7221 A　1/2004

\* cited by examiner

*Primary Examiner*—Rodney E Fuller
(74) *Attorney, Agent, or Firm*—Birch, Stewart, Kolasch & Birch, LLp (57) ABSTRACT

A camera has a shutter release button, held in an initial position, that is movable from the initial position to a full-pressed position via a half-pressed position. The camera has three detectors for detecting that the shutter release button is in the initial, half-pressed and full-pressed positions respectively. When the first detector detects that the shutter release button is displaced from the initial position, it is determined that the shutter release is being activated, so the camera starts preparatory operations for shooting. When the second detector detects the shutter release button in the half-pressed position, the camera completes preparatory operations for shooting. When the third detector detects that shutter release button in the full-pressed position, the camera carries out an actual shutter release to write image data on a memory card.

25 Claims, 10 Drawing Sheets

CAMERA

FIELD OF THE INVENTION

The present invention relates to a camera that is provided with a shutter release button being capable of multistage operations.

BACKGROUND ARTS

Some cameras with such functions as automatic exposure control and auto focusing are provided with a shutter release button which can press by two stages as halfway pressing and full pressing in order to shorten a time lag between a shutter release operation and an actual shutter release. During the halfway pressing, preparatory operations for shooting are carried out, including photometry, aperture control, auto focusing and focus-locking. Upon full pressing of the shutter release button, the actual shutter release is executed.

With such a shutter release button as having the two stages, it is difficult to apply force appropriately to press the button from the half-pressed position to the full-pressed position, which often causes hand shaking or wrong operation. On the other hand, when the shutter release button is moved from the half-pressed position to the full-pressed position in such a short time that the camera cannot complete the exposure control and auto focusing before the shutter release button reaches the full-pressed position, so a time lag from the shutter release operation to an actual exposure operation becomes longer, missing a right moment for the exposure. In order to minimize the time lag during the shutter release operation, it is known to provide a camera with a touch sensor detecting that fingers of a camera operator touch the shutter release button, or an infrared radiation sensor detecting that the fingers come close to the shutter release button, for example, from Japanese Laid-open Patent Application Nos. 2003-287799, 2003-280076 and 2004-7221.

However, since the shutter release button is ordinary located in a position where the camera operator can easily put the fingers on it while holding or framing the camera, the camera operator may often put the fingers close to the shutter release button without intending to capture an image while carrying the camera about. If the preparatory operations for shooting are carried out every time the fingers touch or get close to the shutter release button, a power source battery of the camera would be uselessly consumed.

SUMMARY OF THE INVENTION

In view of the foregoing problems, an object of the present invention is to provide a camera that minimizes a time lag during a shutter release operation while preventing wasting a power source by the unintended frequent preparatory operations for shooting.

A camera of the present invention comprises a shutter release button that is held in an initial position while being not pressed, and is movable from the initial position to a full-pressed position via a half-pressed position; a position detecting device for detecting whether the shutter release button is in the initial position or not, in the half-pressed position or not, or in the full-pressed position or not; and a control device for controlling operations of the camera in accordance with the position of the shutter release button, such that the camera carries out a first operation step when the position detecting device detects that the shutter release button is displaced from the initial position, a second operation step when the position detecting device detects that the shutter release button comes to the half-pressed position, and a third operation step when the position detecting device detects that the shutter release button comes to the full-pressed position, wherein shooting is carried out in the second operation step and/or the third operation step.

According to a preferred embodiment, at least one of preparatory operations for shooting, including photometry, aperture control and focusing, is carried out in the first operation step.

It is preferable to carry out preparatory operations in the first and second operations, such that aperture control and focusing, which need to drive motors, are carried out in the second operation and that those members consuming less power are driven in the first operation step than those driven in second operation step.

It is also preferable to carry out aperture control and/or focusing in the first operation step. In that case, an image is displayed on the display device in the second operation step, whereas an image signal of the image is stored in a storage device in the third operation step. In alternative, a shot image is stored in a storage device and displayed on the display device in the second operation step, whereas any of stored image is displayed on the display device in the third operation step. It is possible to shoot a still image frame in the second operation step, whereas a plural number of successive still image frames are shot in the third operation step.

According to another embodiment, aperture control and/or focusing is carried out in the first operation step, and moving images are shot in the second operation step, whereas a still image frame is shot in the third operation step. Alternatively, aperture control and/or focusing is carried out in the first operation step, and a still image frame is shot in the second operation step, whereas moving images are shot in the third operation step.

The position detecting device comprises a first detector for detecting whether the shutter release button is in the initial position or not. According to an embodiment, the first detector comprises first and second contact members which are kept in contact with each other so long as the shutter release button is in the initial position, and are separated from each other when the shutter release button is displaced from the initial position. The first contact member may be mounted on the shutter release button.

According to another embodiment, the second contact member is resiliently deformed in a direction away from the first contact member as the shutter release button is displaced from the initial position toward the half-pressed position.

The first detector may be comprised of a spring biasing the shutter release button toward the initial position and a piezoelectric sensor detecting load applied on the spring. The first detector may be comprised of a mirror provided on the shutter release button, a light source projecting light toward the mirror, and a photo sensor located to receive light reflected by the mirror. The first detector may also be comprised of a shielding plate provided on the shutter release button and a photo interrupter for detecting the shielding plate.

The present invention prevents wasting the camera power source because the preparatory operations for shooting are not executed just by putting the fingers close to or on the shutter release button. The operation on the shutter release button has three steps, including the start of pressing, the halfway pressing and the full pressing, so that the camera execute some preparation processes while the shutter release button is being pressed from the initial position to the half-pressed position, that is, before the shutter release button reaches the half-pressed position. Therefore, the preparation processes is completed in a shorter time after the shutter release button is pressed further from the half-pressed position, that is, during the time of pressing from the half-pressed position to the full-pressed position. Thereby, the time lag from the release operation to the actual shooting is shortened. Moreover, since the shutter release button is operated in the three steps, the camera can perform plural functions only by operating the shutter release button, it becomes unnecessary to provide many operation keys on the outer surface of the camera, which contributes to simplifying the exterior of the camera, and enabling operating the camera with ease without the need for reframing the camera.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DETAILED DESCRIPTION OF THE PREFERRED EMBODIMENTS

Figure 1:
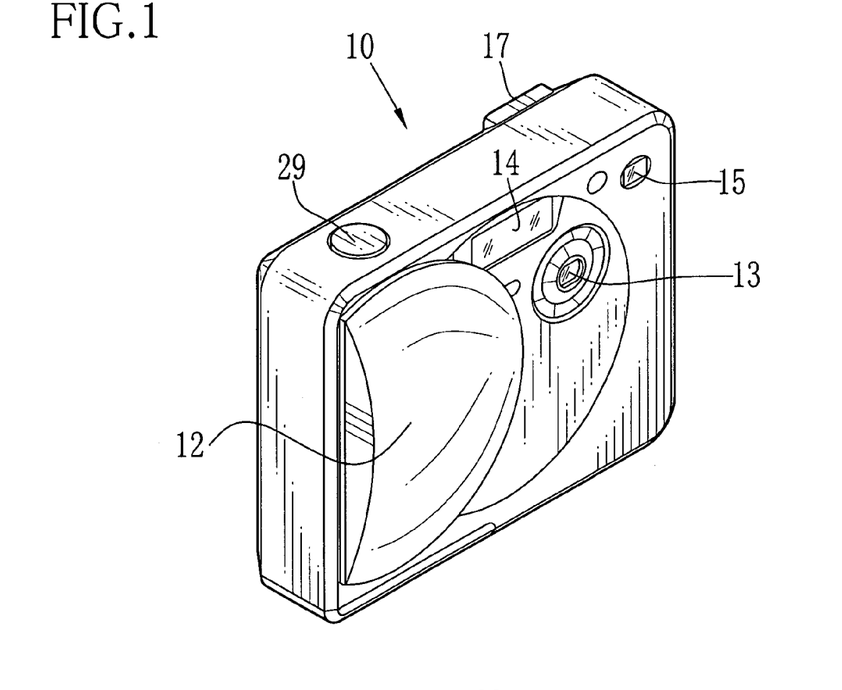
FIG. 1 is a front perspective view of a digital camera.

As Shown in FIG. 1, a digital camera 10 is provided with a sliding lens barrier 12 at the front. By sliding the lens barrier 12 open, a taking lens 13, a flash emitting portion 14 and an optical finder 15 are exposed to the front. Since the lens barrier 12 doubles as a power switch of the digital camera 10, opening the lens barrier 12 turns on the power switch and closing the lens barrier 12 turns off the power switch.

Figure 2:
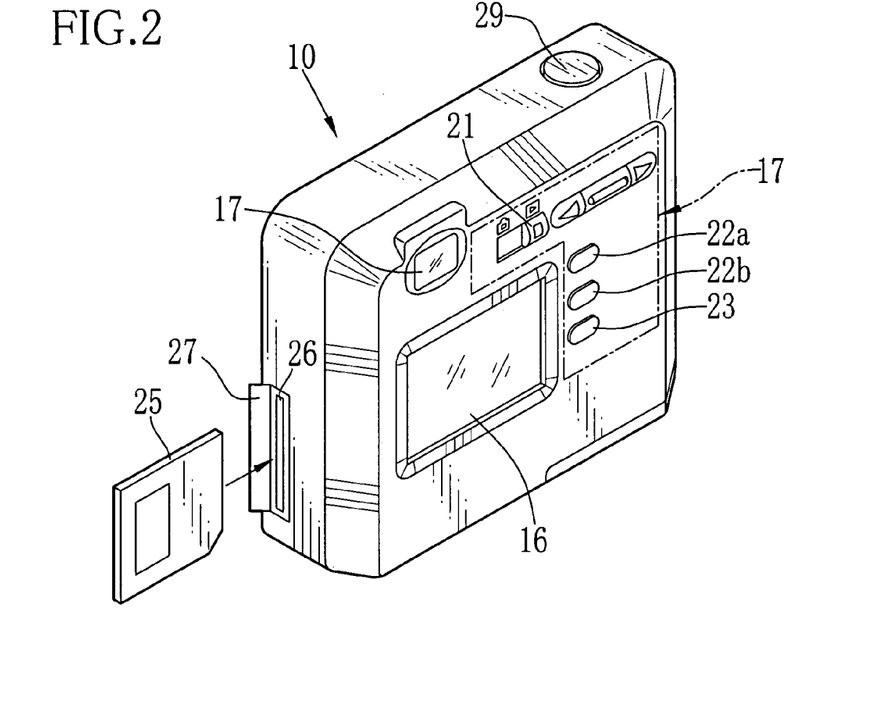
FIG. 2 is a rear perspective view of the digital camera.

As Shown in FIG. 2, the digital camera 10 is provided with a LCD panel 16 and an operation panel 17 at the rear. The LCD panel 16 functions as an electronic view finder which shows a subject image in shooting, and is also used for displaying captured images or setting screens. The operation panel 17 includes a mode switching key 21, selection keys 22a and 22b and a menu button 23. The mode switching key 21 is operated to switch over between a shooting mode and a reproduction mode. The selection keys 22a and 22b are used for selecting items on the setting screens displayed upon operating the menu button 23 or for displaying the captured images successively in a forward direction or in a backward direction in the reproducing mode.

The digital camera 10 is provided with a memory card slot 26 on one side, to insert a memory card 25 for storing the captured images. The memory card slot 26 is shielded by a cover 27 that is opened when inserting or ejecting the memory card 25.

The digital camera 10 is provided with a shutter release button 29 on the top to be pressed for shooting. The digital camera 10 detects three displacement degrees of the shutter release button 29, including short pressing, half pressing and full pressing, to start different kinds of processing or operations corresponding to the respective displacements of the shutter release button 29. Though the details will be explained later, the short pressing of the shutter release button 29 leads to photometry, and the half pressing thereof leads to aperture control and focusing, whereas the full pressing thereof leads to shooting to capture the subject image.

Figure 3:
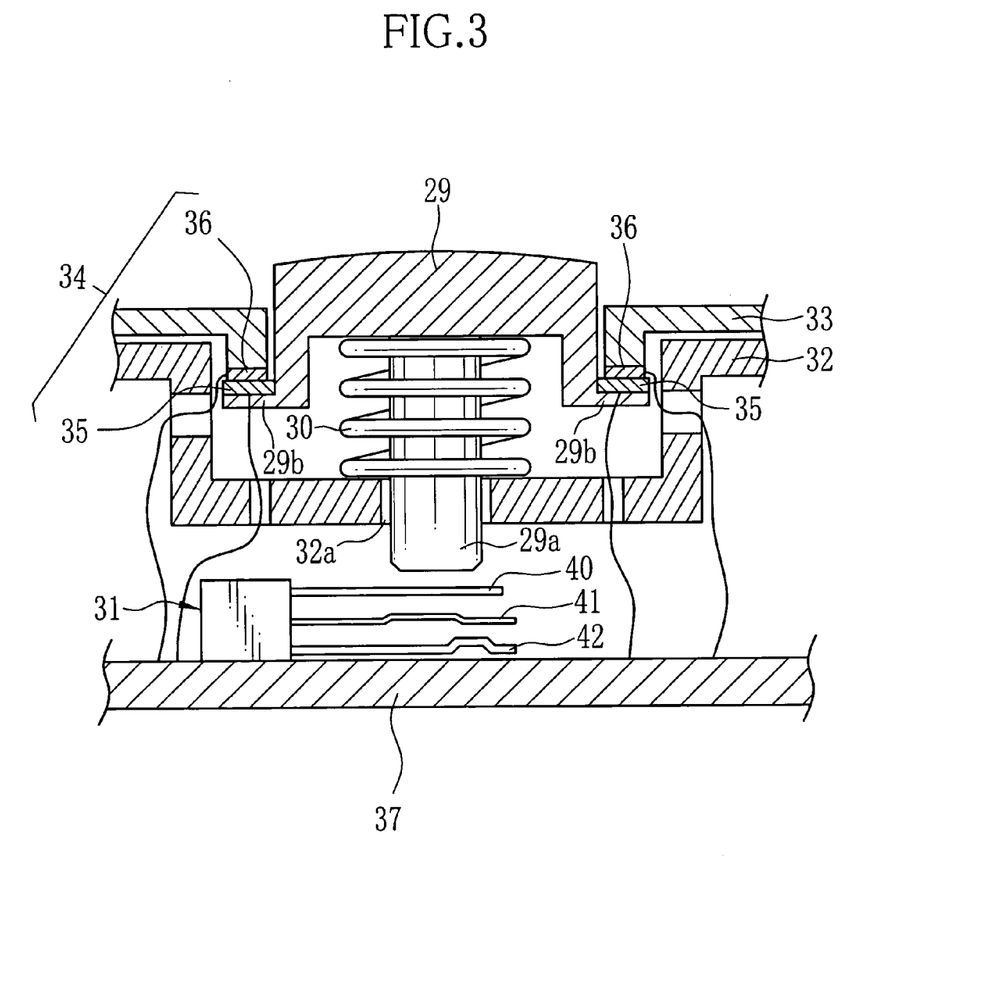
FIG. 3 is a cross-sectional view of a shutter release button.

As shown in FIG. 3, the shutter release button 29 has a pressing shaft 29a that protrudes from the bottom, and a flange 29b that protrude outward from a bottom rim of the shutter release button 29. A coiled spring 30 is fitted on the pressing shaft 29a. The pressing shaft 29a protrudes downward through an aperture 32a opened through a holding member 32, and turns on a shutter release switch 31 arranged below, when the shutter release button 29 is pressed down. The coiled spring 30 is held from below by the holding member 32 and biases the shutter release button 29 upward. As being biased by the coiled spring 30, the shutter release button 29 is held in an initial position where the flange 29b touches a housing 33.

A press detection switch 34 consists of a first electrode 35 placed on the flange 29b and a second electrode 36 placed on the housing 33. While the shutter release button 29 is held in the initial position by the bias of the coiled spring 30, that is, where the shutter release button 29 is not pressed, the first and second electrodes 35 and 36 are in contact with each other and conductive. When the shutter release button 29 is pressed, the two electrodes 35 and 36 are parted from each other. The first and second electrodes 35 and 36 are respectively connected to a circuit board 37 which is provided with the shutter release switch 31. The shutter release switch 31 has a first contact strip 40, a second contact strip 41 and a third contact strip 42. Pressing the shutter release button 29 to a half-pressed position lets the pressing shaft 29a press the first contact strip 40, so the first contact strip 40 is resiliently deformed and comes into contact with the second contact strip 41. Pressing the shutter release button 29 to a full-pressed position lets the pressing shaft 29a press the first and second contact strips 40 and 41 to be more resiliently deformed till the second contact strip 41 comes into contact with the third contact strip 42.

Figure 4:
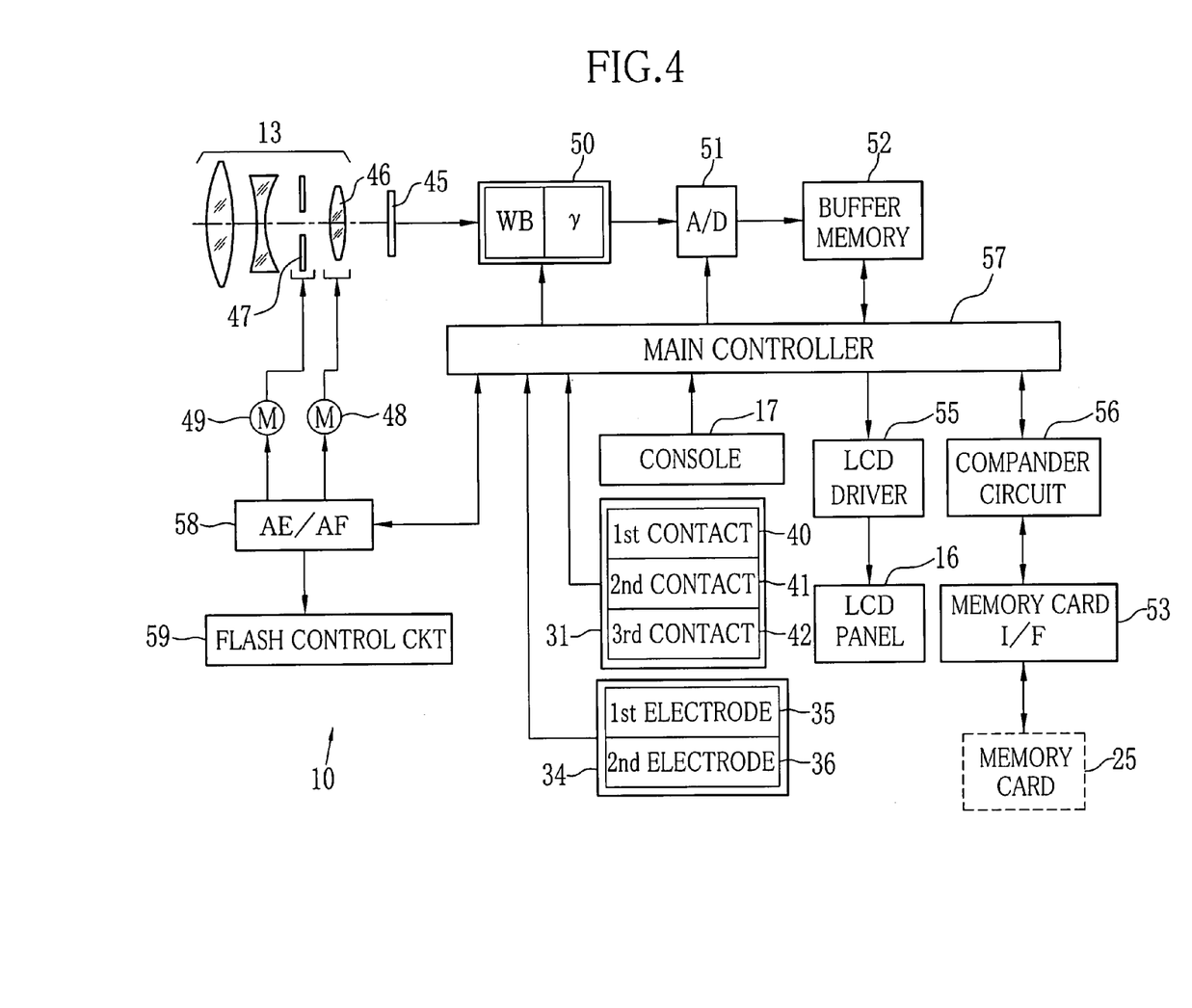
FIG. 4 is a block diagram of the digital camera.

As shown in FIG. 4, a CCD image sensor 45 is arranged behind the taking lens 13 and gains an image signal by photoelectrically converting an optical image of a subject. The taking lens 13 is provided with a focus lens 46 so as to provide a sharp image of the subject to the CCD image sensor 45. The focus lens 46 moves along an optical axis of the taking lens 13 by a driving force of a focus motor 47. The taking lens 13 has a variable stop 48 inside, which can change an aperture size by driving an aperture size switching blade by a driving force of an iris motor 49.

The CCD image sensor 45 outputs the image signal to a signal processing circuit 50 which carries out image signal amplification, noise reduction processing, white balance adjustment and gamma correction. The signal processing circuit 50 outputs the image signal to an A/D converter 51 where the analog image signal is converted to digital image data. A buffer memory 52 temporarily stores the digital image data.

A LCD driver 55 converts the image data stored in the buffer memory 52 so as to have a pixel count suitable for displaying the images on the LCD panel 16, and reconverts the image data to analog image signal, and outputs the analog image signal to the LCD panel 16. With full pressing of the shutter release button 29, a compander circuit 56 captures the image data from the buffer memory 52 and performs image compression, such as JPEG compression, of the captured image data. The compressed image data is written on the memory card 25 via a memory card interface 53. While reading the image data written on the memory card 25, the compander circuit 56 also decompresses or expands the image data in order to display the captured image on the LCD panel 16.

A main controller 57 sends control signals in accordance with switching conditions of the operation panel 17, the press detection switch 34 and the shutter release switch 31 to respective parts and controls electrical operations of the digital camera 10. An AE/AF controller 58 adjusts the position of the focus lens 46 and the aperture size of the variable stop 48 by driving the focus motor 47 and the iris motor 49 respectively. The AE/AF controller 58 also judges the necessity of flash light according to subject brightness and then sends a flash ON signal or a flash OFF signal to a flash control circuit 59.

The main controller 57 detects the short pressing of the shutter release button 29 when the press detection switch 34 turns off in the shooting mode. Then the main controller 57 measures the subject brightness based on brightness information of the captured image and controls the gain of the image signal in the signal processing circuit 50. When the first contact strip 40 comes into contact with the second contact strip 41 of the shutter release switch 31, the main controller 57 detects the halfway pressing of the shutter release button 29, and carries out focusing via the AE/AF controller 58, and controls the aperture size of the variable stop 48 according to the subject brightness.

The main controller 57 detects full pressing of the shutter release button 29 when the first to third contact strips 40, 41 and 42 of the shutter release switch 31 come into contact with one another. When the full pressing of the shutter release button 29 is detected, the image data stored in the buffer memory 52 is sent to the compander circuit 56 and written on the memory card 25.

Figure 5:
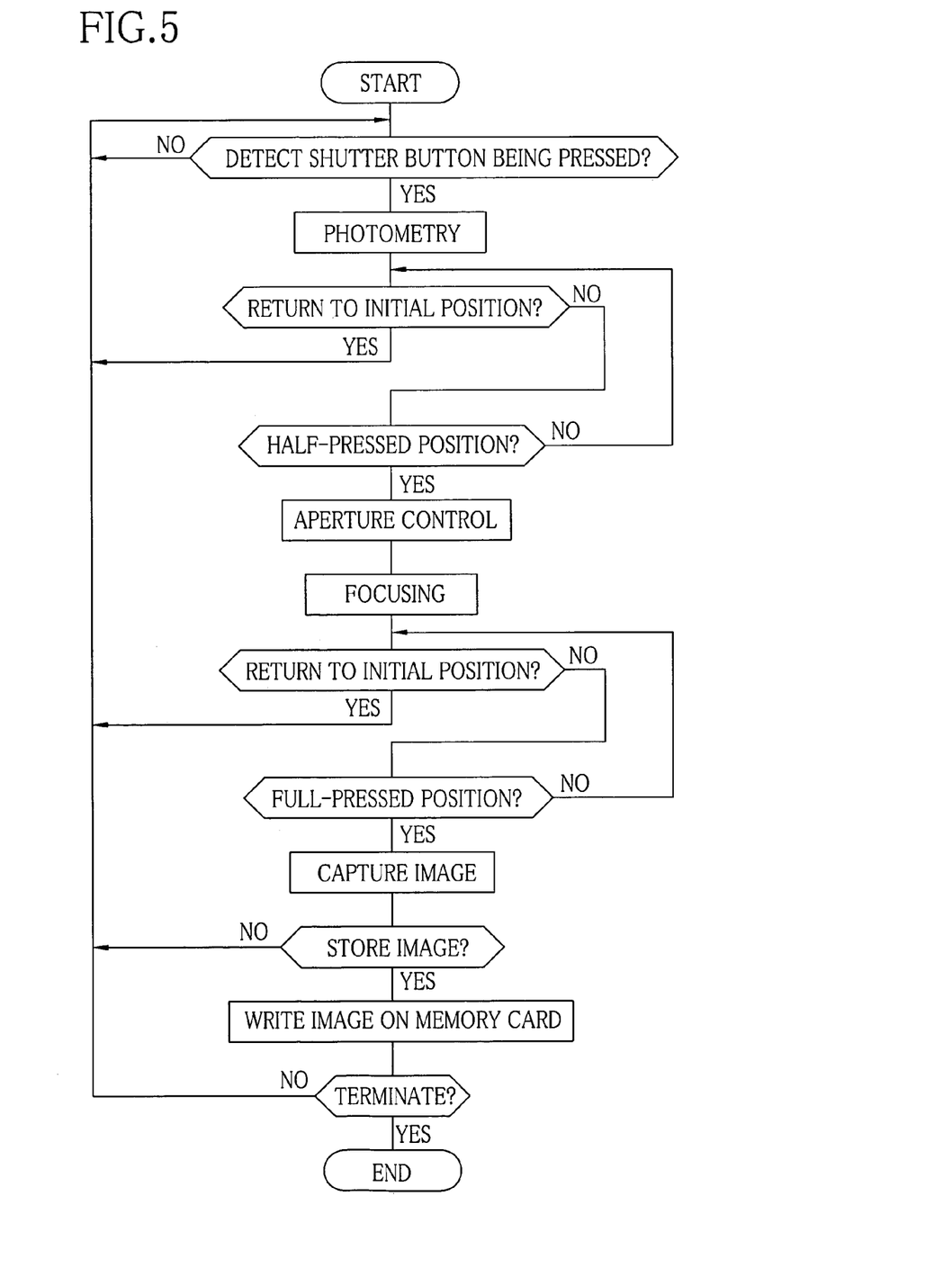
FIG. 5 is a flowchart illustrating an operation sequence of the digital camera.

Next, the operations of the digital camera 10 will be explained with reference to FIG. 5. Sliding the lens barrier 12 open turns on the power switch of the digital camera 10. After the shooting mode is set by operating the mode switching key 21, the main controller 57 activates the CCD image sensor 45. The CCD image sensor 45 images subject light as transmitted through the taking lens 13 and outputs the image signal to the signal processing circuit 50. The image signal is sent to the buffer memory 52 via the signal processing circuit 50 and the A/D converter 51, so it is stored as the image data in the buffer memory 52. The main controller 57 sends the image data stored in the buffer memory 52 to the LCD driver 55, so the LCD panel 16 displays the subject image. Because the subject images picked up through the CCD image sensor 45 are displayed one after another on the LCD panel 16, a camera operator can make sure an image capturing field while watching the LCD panel 16.

When the camera operator presses the shutter release button 29 after fixing the image capturing field, the flange 29b moves away from the housing 33 against the bias of the coiled spring 30, so the first and second electrodes 35 and 36 are disconnected, which leads the main controller 57 to detect that the press detection switch 34 is turned off. The main controller 57 starts reading the image data from the buffer memory 52 and performs the photometry to measure a subject brightness from a total brightness of the pixels. At this moment, the aperture control and focusing are not executed.

As the shutter release button 29 is pressed further, the pressing shaft 29a of the shutter release button 29 presses the first contact strip 40 to be resiliently deformed. When the shutter release button 29 reaches the half-pressed position, the first contact strip 40 comes into contact with the second contact strip 41, and thus the two contact strips are electrically connected, which is detected by the main controller 57. As soon as the main controller 57 detects that the shutter release button 29 is half-pressed, the main controller 57 sends a signal to the AE/AF controller 58. If the shutter release button 29 returns to the initial position before reaching the half-pressed position, procedures go back to a standby stage. The camera 10 stays in the standby stage until the press detection switch 34 is turned off again by pressing the shutter release button 29.

The AE/AF controller 58 drives the focus motor 47 and the iris motor 49. The iris motor 49 is driven so that the aperture size of the variable stop 48 is proper with regard to the subject brightness. The main controller 57 calculates image contrast every time the focus lens 46 is displaced by the focus motor 47, and sends a signal to the AE/AF controller 58 to stop the focus motor 47 when the highest contrast is obtained. In this way, those operations which need to drive the motors 47 and 49 and thus consume more power than the photometry are carried out first when the shutter release button 29 is pressed halfway.

The halfway pressing of the shutter release button 29 leads to executing the aperture control and focusing, completing the preparatory operations for shooting. Pressing the shutter release button 29 further from the half-pressed position causes the first and second contact strips 40 and 41 to be resiliently deformed. When the shutter release button 29 comes to the full-pressed position, the second contact strip 41 comes into contact with the third contact strip 42. Thus, the first to third contact strips 40 to 42 are brought into contact with each other, which is detected by the main controller 57. As detecting that the shutter release button 29 is full-pressed, the main controller 57 sends the image data stored in the buffer memory 52 to the LCD driver 55 and makes the LCD panel 16 display the captured image. If the shutter release button 29 returns to the initial position before reaching the full-pressed position, the procedures go back to the standby stage until it is detected that the press detection switch 34 is turned off.

When the captured image is selected to be stored in the memory card 25 by the operation of the operation panel 17, the main controller 57 sends the image data stored in the buffer memory 52 to the compander circuit 56. The image data is compressed in the compander circuit 56 and written on the memory card 25 by the memory card interface 53. A sequence of operations in the shooting mode are carried out in the way as described so far.

Setting the mode switching key 21 at the reproduction mode allows calling up the captured image stored in the memory card 25 and displaying it on the LCD panel 16. The captured image is displayed turn by turn according to the captured order by operating the operation panel 17.

Figure 6:
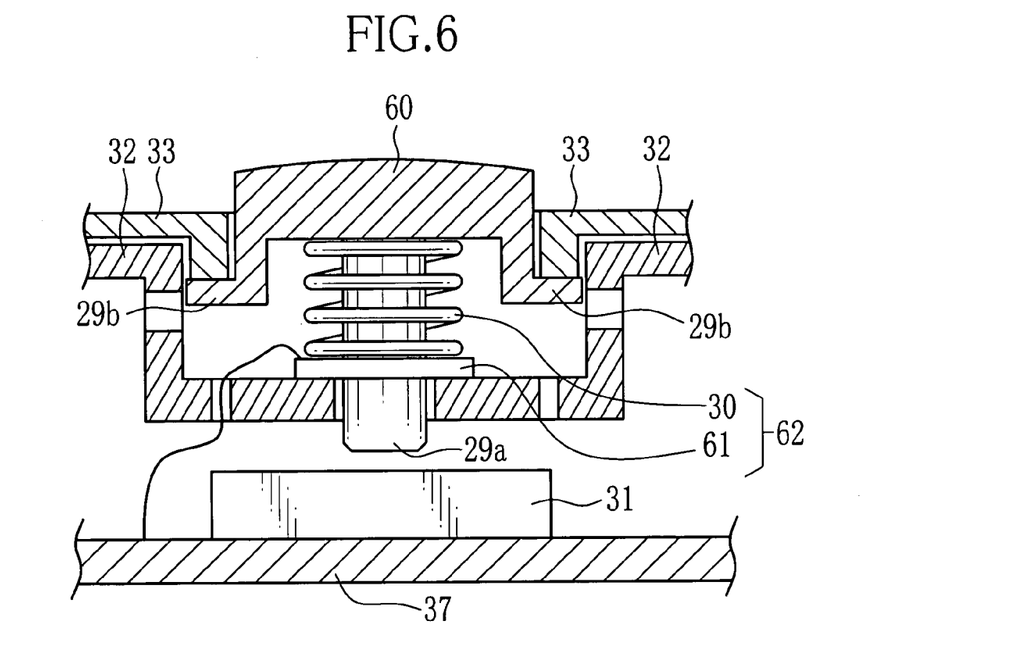
FIG. 6 is a cross-sectional view of the shutter release button according to a second embodiment.

In the above described embodiment, the press detection switch 34 consists of the first electrode 35 placed on the shutter release button 29 and the second electrode 36 placed on the housing 33, and a start of pressing the shutter release button 29 is detected by detecting that the two electrodes 35 and 36 are disconnected. The present invention, however, is not limited to this embodiment. For example as shown in FIG. 6, it is possible to provide a piezoelectric sensor 61 between a coiled spring 30 biasing a shutter release button 60 and a holding member 32, so that a press detection switch 62 electrically detects a change of load applied on the coiled spring 30 by the piezoelectric sensor 61 when the shutter release button 60 is pressed.

Figure 7:
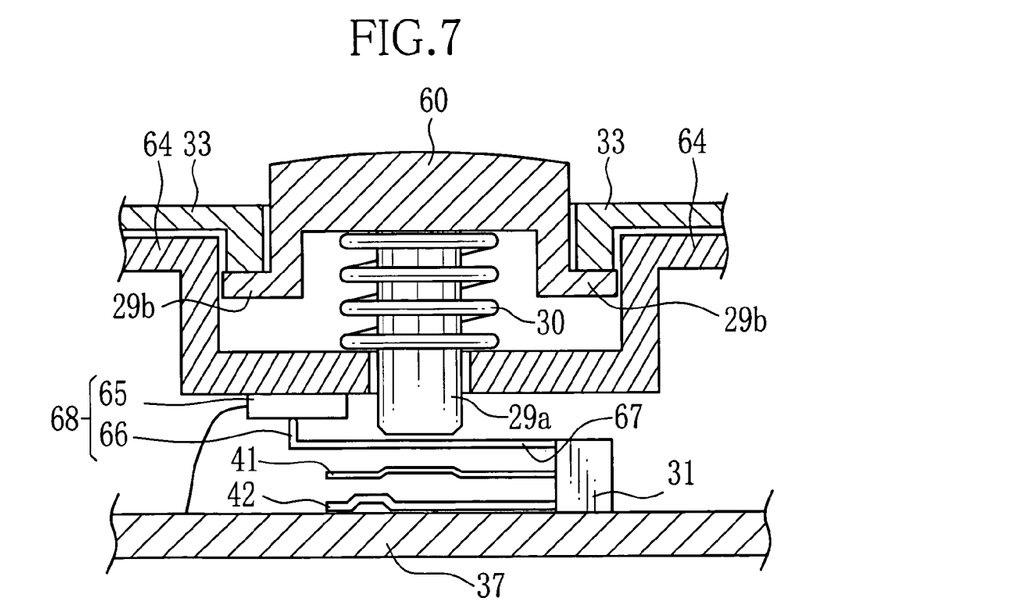
FIG. 7 is a cross-sectional view of the shutter release button according to a third embodiment.

As shown in FIG. 7, it is also possible to comprise a press detection switch 68 to detect the press of a shutter release button 60 by providing a first electrode 65 on a bottom surface of a holding member 64 and a first contact strip 67 having an electrode section 66 which is in contact with the first electrode 65 in a natural state. The press detection switch 68 detects that the shutter release button 60 is pressed when the contact between the first electrode 65 and the electrode section 66 is broken as the first contact strip 67 is resiliently deformed by a pressing shaft 29a. This embodiment avoids a complicated connection between respective electrodes and a circuit board 37.

Figure 8:
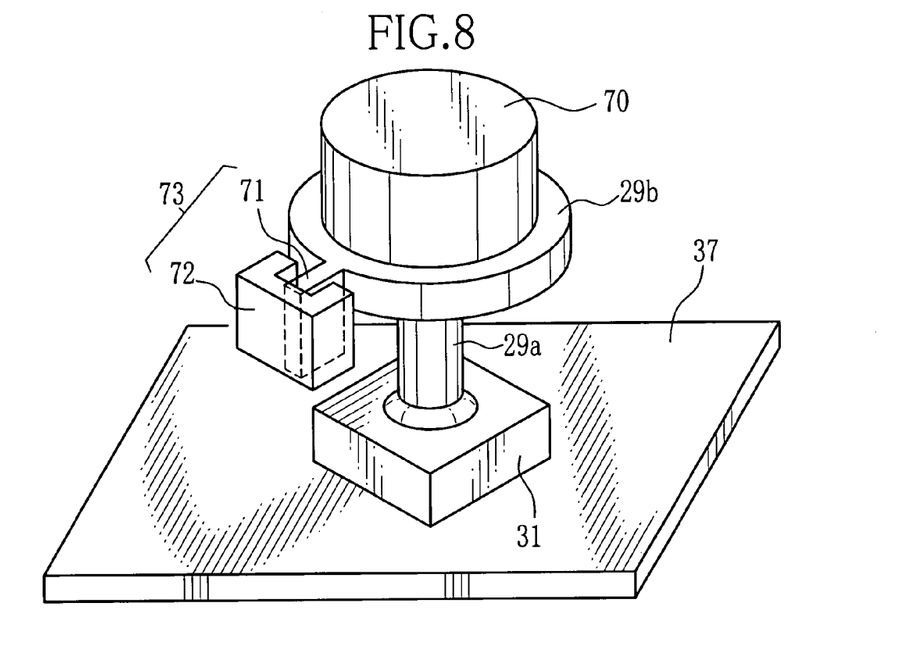
FIG. 8 is a cross-sectional view of the shutter release button according to a fourth embodiment.

Alternatively, as shown in FIG. 8, it is possible to constitute a press detection switch 73 of a shielding plate 71, which is formed integrally with a shutter release button 70 and is elongated in a pressing direction of the shutter release button 70, and a photo interrupter 72 letting the shielding plate 71 enter between its light emitter and its light receptor. In this embodiment, so long as the shutter release button 70 is not pressed but kept in an initial position, light from the light emitter of the photo interrupter 72 falls on the light receptor. Accordingly, the light from the light emitter is blocked by the shielding plate 71 as the shutter release button 70 is pressed. On the contrary, however, the same effect is achieved where the photo interrupter 72 is located so that light from the light emitter is blocked by the shielding plate 71 in the initial position of the shutter release button 70, and falls on the light receptor upon pressing the shutter release button 70.

Figure 9:
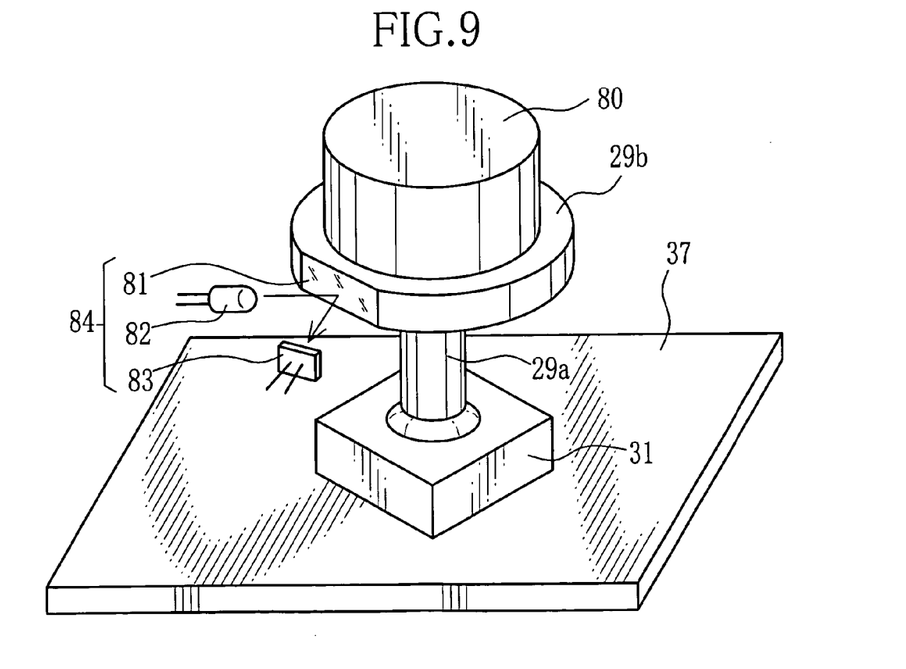
FIG. 9 is a cross-sectional view of the shutter release button according to a fifth embodiment.

As shown in FIG. 9, it is possible to provide a press detection switch 84 which consists of a light-emitting diode 82 which emits light to a mirror 81 provided on a shutter release button 80 and a photo diode 83 as a photo sensor placed symmetrical to the light-emitting diode 82 with respect to a reflecting surface of the mirror 81. When the shutter release button 80 is in an initial position, the mirror 81 is located so as to reflect the light from the light-emitting diode 82 toward the photo diode 83. When the shutter release button 80 is pressed, the position of the mirror 81 changes and the light of the light-emitting diode 82 is not detected by the photo diode 83, which allows detecting that the shutter release button 80 is pressed.

Figure 10:
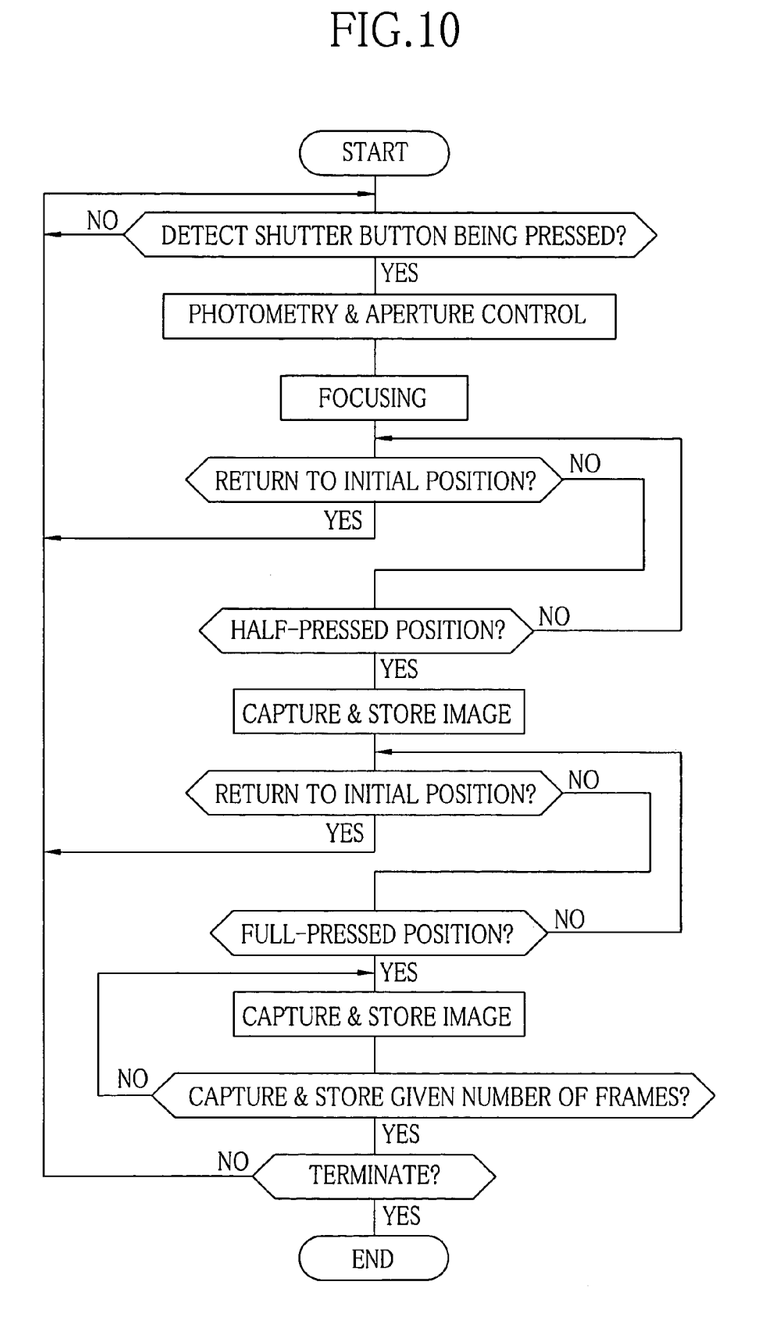
FIG. 10 is a flowchart illustrating an operation sequence of the digital camera according to another embodiment, wherein three operational positions of a shutter release button are assigned to different camera operations from ones in the embodiment of FIG. 5.

FIG. 10 illustrates a flowchart of an embodiment wherein respective operational positions of a shutter release button 29 are assigned to different operations of a digital camera 10. According to this embodiment, as soon as a start of pressing the shutter release button 29 is detected, photometry, aperture control and focusing are executed to complete the preparatory operations for shooting. When the shutter release button 29 reaches a half-pressed position, image capturing starts to write image data on a memory card 25. Pressing the shutter release button 29 further from the half-pressed position to a full-pressed position makes a sequential shooting mode active. A CCD image sensor 45 executes imaging for example at a frame rate of thirty frames per second, and a number "n" of successive frames, for example five successive frames, are captured in the sequential shooting mode. Consequently the memory card 25 stores six image frames at each sequential shooting, consisting of one frame captured at the halfway pressing and five frames captured at the full pressing.

Figure 11:
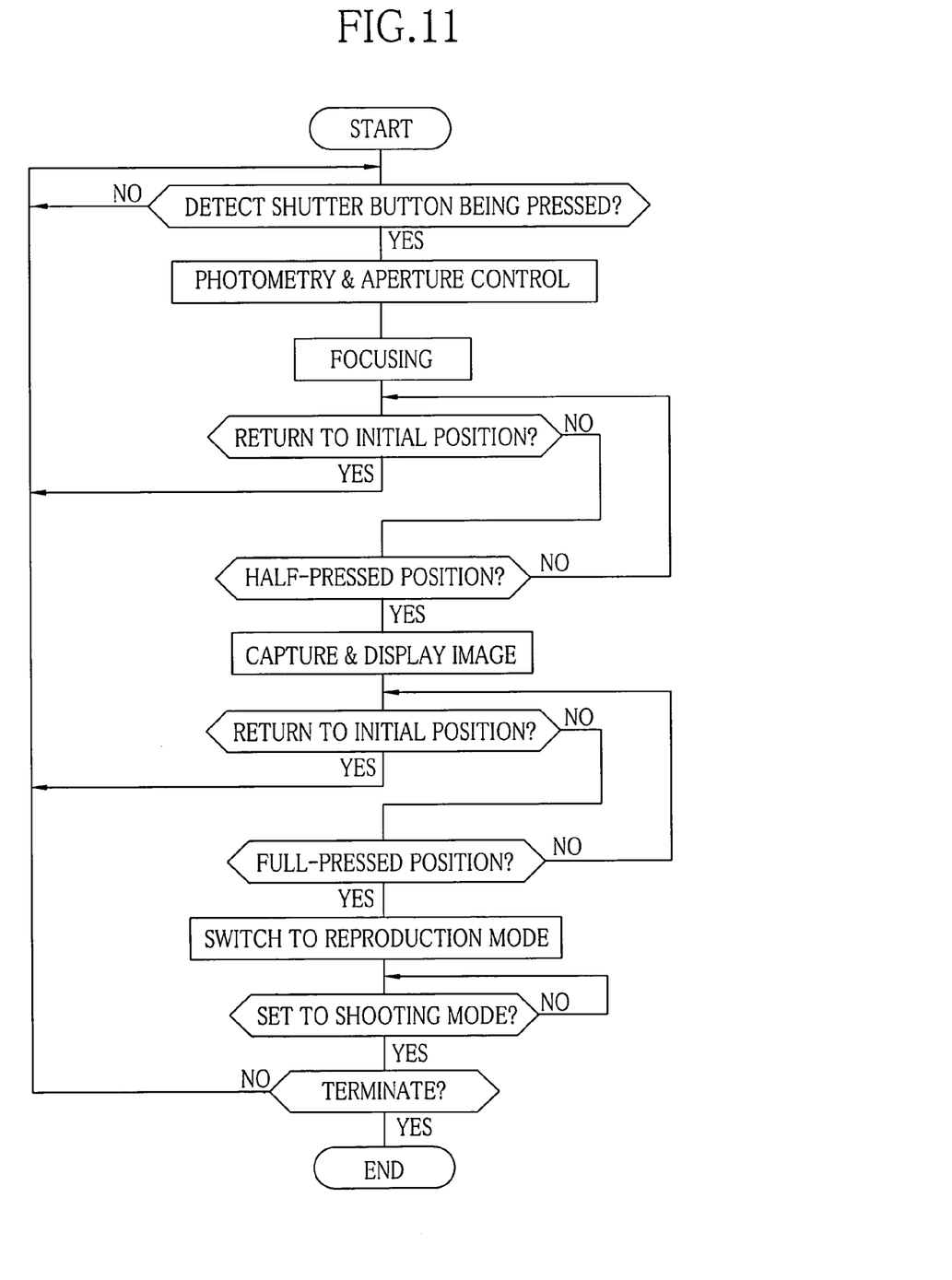
FIG. 11 is a flowchart illustrating an operation sequence of the digital camera according to still another embodiment, wherein assignments of three operational positions of a shutter release button to camera operations are modified.

FIG. 11 illustrates a flowchart of another embodiment wherein respective operational positions of a shutter release button 29 are assigned to different operations from ones shown in FIG. 10. According to this embodiment, the preparatory operations for shooting are completed by executing photometry, aperture control and focusing when it is detected that the shutter release button 29 is displaced from the initial position. When the shutter release button 29 reaches a half-pressed position, image capturing starts to write image data on a memory card 25. Moreover a captured image is displayed on a LCD panel 16, and stays there as long as the shutter release button 29 is kept in the half-pressed position. Upon pressing the shutter release button 29 from the half-pressed position to a full-pressed position, the camera switches from a shooting mode to a reproduction mode, allowing calling up image data stored in the memory card 25 and displaying the stored captured image appropriately without operating a mode switching key 21.

In the case the mode switching key 21 is such a multi-contact switch as a slide switch, it is preferable to let the mode switching key 21 move to a setting position for the reproduction mode in cooperation with the move of the shutter release button 29 to the full-pressed position. It is also possible to switch from the reproduction mode to the shooting mode by operating the shutter release button again to set the shooting mode after once the mode switching key 21 is moved to the position for the reproduction mode.

Figure 12:
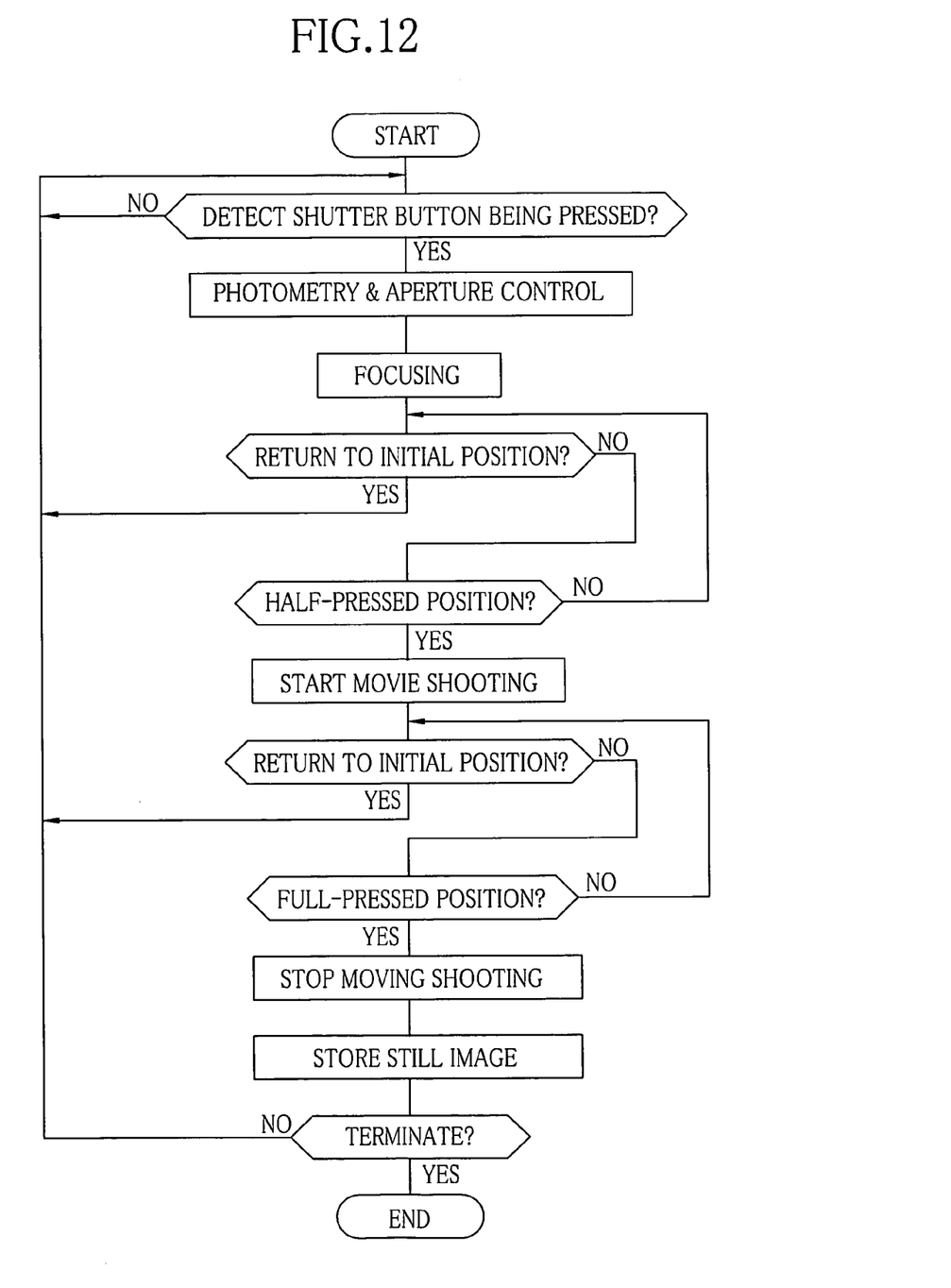
FIG. 12 is a flowchart illustrating an operation sequence of the digital camera according to a further embodiment, wherein assignment of three operational positions of a shutter release button to camera operations are further modified.

FIG. 12 illustrates a flowchart of another embodiment wherein respective operational positions of a shutter release button 29 are assigned to different operations from ones shown in FIGS. 10 and 11. According to this embodiment, the preparatory operations for shooting are competed by executing photometry, aperture control and focusing when a start of pressing the shutter release button 29 is detected. When the shutter release button 29 reaches a half-pressed position, a movie shooting mode starts, wherein images as imaged, for example, at a frame rate of thirty frames per second by a CCD image sensor 45, are recorded in accordance with a given movie format. In the movie shooting mode, a resolution of the image is lower than that for shooting still images. For example, moving images are recorded at a low frame rate of fifteen frames per second. Available time for movie shooting is predetermined based on a memory capacity of a memory card 25, so the recording of the moving images stops automatically in the predetermined time, for example, in several minutes. Upon pressing the shutter release button 29 from the half-pressed position to a full-pressed position, the movie shooting stops and the still image shooting starts. Therefore, the camera operator can switch quickly from the movie shooting mode to the still image shooting mode to record a still image at a high resolution without missing a right moment during the movie shooting.

Figure 13:
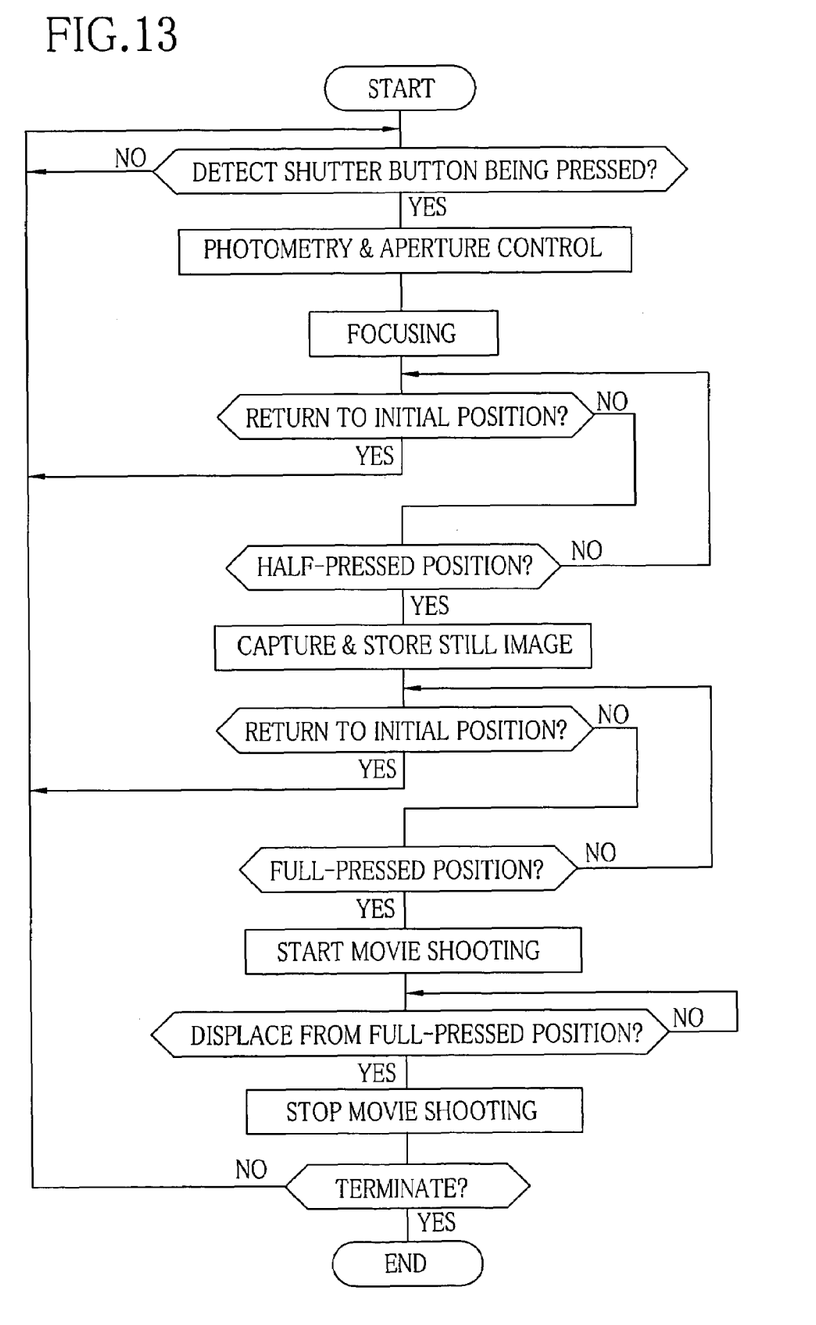
FIG. 13 is a flowchart illustrating an operation sequence of the digital camera according to another embodiment wherein three operational positions of a shutter release button are assigned to different camera operations from ones in other embodiments.

FIG. 13 illustrates a flowchart of another embodiment wherein respective operational positions of a shutter release button 29 are assigned to different operations from ones shown in FIGS. 10, 11 and 12. According to this embodiment, the preparatory operations for shooting are completed by executing photometry, aperture control and focusing when a start of pressing the shutter release button 29 is detected. When the shutter release button 29 reaches a half-pressed position, image capturing starts and image data of a still image is written on a memory card 25. Upon pressing the shutter release button 29 from the half-pressed position to a full-pressed position, the still image shooting mode is switched to the above-mentioned movie shooting mode. As long as the shutter release button 29 is kept in the full-pressed position, the movie shooting mode continues to record movie images. The movie shooting stops when the shutter release button 29 is displaced from the full-pressed position, that is, when the second contact strip 41 moves apart from the third contact strip 42 in the embodiments shown in FIGS. 3 and 7. For this reason, quick switching from the still image shooting to the movie shooting is achieved.

According to these embodiments, operations executed at the halfway pressing and those executed at the full pressing are fixed. It is, however, possible for a user to customize the operations to be executed at the respective operational positions of the shutter release button.

The present invention is applicable not only to a digital camera but also to a silver salt camera using a photo film. As for an auto focusing camera that carries out focusing after range-finding based on a measured subject distance, it is possible to execute photometry and the rang-finding at a start of pressing a shutter release button and to execute the exposure control and the focusing upon the halfway pressing, based on the result of the photometry and the range-finding.

As for a camera that can get ready for shooting immediately after being powered on, it is possible to let the camera be switched from a standby state to an active or powered-on state at the same moment as it detects pressing a shutter release button.

Thus, the present invention is not to be limited to the above embodiments but, on the contrary, various modifications will be possible without departing from the scope of claims appended hereto.

What is claimed is:

1. A camera comprising:
   a shutter release button that is held in an initial position while being not pressed, and is movable from said initial position to a full-pressed position via a half-pressed position;
   a position detecting device for detecting whether said shutter release button is in the initial position or not, in the half-pressed position or not, or in the full-pressed position or not; and
   a control device for controlling operations of the camera in accordance with the position of said shutter release button, such that the camera carries out a first operation step when said position detecting device detects that said shutter release button is displaced from the initial position, a second operation step when said position detecting device detects that said shutter release button comes to the half-pressed position, and a third operation step when said position detecting device detects that said shutter release button comes to the full-pressed position, wherein shooting is carried out in said second operation step and/or said third operation step.

2. A camera as claimed in claim 1, wherein at least one of preparatory operations for shooting, including photometry, aperture control and focusing, is carried out in said first operation step.

3. A camera as claimed in claim 2, wherein said preparatory operations are carried out in said first and second operations, such that those members consuming less power are driven in said first operation step than those driven in second operation step.

4. A camera as claimed in claim 3, wherein aperture control and focusing, which need to drive motors, are carried out in said second operation.

5. A camera as claimed in claim 2, further comprising an imaging device for picking tip an image signal from an optical image of a subject and a display device for displaying an image based on said image signal, wherein aperture control and/or focusing is carried out in said first operation step, and an image is displayed on said display device in said second operation step, whereas an image signal of said image is stored in a storage device in said third operation step.

6. A camera as claimed in claim 5, further comprising an operation device for choosing whether to store said displayed still image or not in said third operation step.

7. A camera as claimed in claim 2, further comprising an imaging device for picking up an image signal from an optical image of a subject and a display device for displaying an image based on said image signal, wherein aperture control and/or focusing is carried out in said first operation step, and an image is shot and stored in a storage device, and said image is displayed on said display device in said second operation step, whereas any of stored image is displayed on said display device in said third operation step.

8. A camera as claimed in claim 2, wherein aperture control and/or focusing is carried out in said first operation step, and a still image frame is shot in said second operation step, whereas a plural number of successive still image frames are shot in said third operation step.

9. A camera as claimed in claim 2, wherein aperture control and/or focusing is carried out in said first operation step, and moving images are shot in said second operation step, whereas a still image frame is shot in said third operation step.

10. A camera as claimed in claim 2, wherein aperture control and/or focusing is carried out in said first operation step, and a still image frame is shot in said second operation step, whereas moving images are shot in said third operation step.

11. A camera as claimed in claim 1, wherein said position detecting device comprises a first detector for detecting whether said shutter release button is in the initial position or not, said first detector comprising first and second contact members which are kept in contact with each other so long as said shutter release button is in the initial position, and are separated from each other when said shutter release button is displaced from the initial position.

12. A camera as claimed in claim 11, wherein said first contact member is mounted on said shutter release button.

13. A camera as claimed in claim 11, wherein said second contact member is resiliently deformed in a direction away from said first contact member as said shutter release button is displaced from the initial position toward the half-pressed position.

14. A camera as claimed in claim 13, wherein said position detecting device comprises a second detector for detecting whether said shutter release button is in the half-pressed position or not, and said second detector comprises said second contact member and a third contact member, said second contact member being brought into contact with said third contact member when said shutter release button comes to the half-pressed position.

15. A camera as claimed in claim 1, wherein said position detecting device comprises a first detector for detecting whether said shutter release button is in the initial position or not, said first detector comprising a spring biasing said shutter release button toward the initial position and a piezoelectric sensor detecting load applied on said spring.

16. A camera as claimed in claim 1, wherein said position detecting device comprises a first detector for detecting whether said shutter release button is in the initial position or not, said first detector comprising a mirror provided on said shutter release button, a light source projecting light toward said minor, and a photo sensor located to receive light reflected by said minor.

17. A camera as claimed in claim 1, wherein said position detecting device comprises a first detector for detecting whether said shutter release button is in the initial position or not, said first detector comprising a shielding plate provided on said shutter release button and a photo interrupter for detecting said shielding plate.

18. A method for controlling a camera including a shutter release button that is held in an initial position while being not pressed, and is movable from said initial position to a full-pressed position via a half pressed position, the method comprising:
    detecting whether said shutter release button is in the initial position, the half-pressed position, or the full-pressed position; and
    controlling operations of the camera in accordance with the position of said shutter release button, such that the camera carries out a first operation step when it is detected that said shutter release button is displaced from the initial position, a second operation step when it is detected that said shutter release button comes to the half-pressed position, and a third operation step when it is detected that said shutter release button comes to the full-pressed position, wherein shooting is carried out in said second operation step and/or said third operation step.

19. The method as claimed in claim 18, wherein at least one of preparatory operations for shooting, including photometry, aperture control and focusing, is carried out in said first operation step, and
    further wherein said preparatory operations are carried out in said first and second operation steps in such a way that those members consuming less power are driven in said first operation step than those driven in second operation step.

20. The method as claimed in claim 19, wherein aperture control and focusing, which need to drive motors, are carried out in said second operation step.

21. The method as claimed in claim 18, wherein the camera includes an imaging device for picking up an image signal from an optical image of a subject and a display device for displaying an image based on said image signal, and
    further wherein aperture control and/or focusing is carried out in said first operation step, and said image is displayed on said display device in said second operation step, and said image signal of said image is stored in a storage device in said third operation step.

22. The method as claimed in claim 18, wherein the camera includes an imaging device for picking up an image signal from an optical image of a subject and a display device for displaying an image based on said image signal, and
    further wherein aperture control and/or focusing is carried out in said first operation step, and said image is shot and stored in a storage device, and said image is displayed on said display device in said second operation step, and a stored image is displayed on said display device in said third operation step.

23. The method as claimed in claim 18, wherein aperture control and/or focusing is carried out in said first operation step, and a still image frame is shot in said second operation step, and a plural number of successive still image frames are shot in said third operation step.

24. The method as claimed in claim 18, wherein aperture control and/or focusing is carried out in said first operation step, and moving images are shot in said second operation step, and a still image frame is shot in said third operation step.

25. The method as claimed in claim 18, wherein aperture control and/or focusing is carried out in said first operation step, and a still image frame is shot in said second operation step, and moving images are shot in said third operation step.

* * * * *